United States Patent
Paz et al.

(10) Patent No.: US 11,895,049 B2
(45) Date of Patent: Feb. 6, 2024

(54) PHASE NOISE (PN) MITIGATION PILOT ALLOCATION ON A SINGLE COMPONENT CARRIER (CC) FOR PN MITIGATION ON MULTIPLE CCS

(71) Applicant: QUALCOMM Incorporated, San Diego, CA (US)

(72) Inventors: Daniel Paz, Geva Carmel (IL); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 17/405,403

(22) Filed: Aug. 18, 2021

(65) Prior Publication Data

US 2023/0053678 A1    Feb. 23, 2023

(51) Int. Cl.
H04L 5/00       (2006.01)
H04W 24/08   (2009.01)

(52) U.S. Cl.
CPC ............ H04L 5/0048 (2013.01); H04L 5/001 (2013.01); H04W 24/08 (2013.01)

(58) Field of Classification Search
CPC ....... H04L 5/0048; H04L 5/001; H04W 24/08
See application file for complete search history.

(56) References Cited

U.S. PATENT DOCUMENTS

| 2018/0091350 A1 | 3/2018 | Akkarakaran et al. |
| 2019/0222385 A1* | 7/2019 | Hessler ............. H04W 72/1268 |
| 2020/0052950 A1* | 2/2020 | Manolakos ......... H04L 27/2657 |
| 2021/0058212 A1* | 2/2021 | Si ........................... H04L 5/0094 |
| 2021/0282037 A1* | 9/2021 | Zhao ..................... H04L 1/0026 |
| 2022/0345345 A1* | 10/2022 | Kim ....................... H04L 5/006 |

FOREIGN PATENT DOCUMENTS

CN    109194594 A    1/2019

OTHER PUBLICATIONS

Convida Wireless: "On NR Operation Between 52.6 GHz and 71 GHz", 3GPP TSG-RAN WG1 #102, R1-2006628, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, XP051918151, pp. 1-4, p. 2.
International Search Report and Written Opinion—PCT/US2022/074937—ISA/EPO—dated Oct. 17, 2022.

\* cited by examiner

*Primary Examiner* — Kevin C. Harper
(74) *Attorney, Agent, or Firm* — Patterson + Sheridan, LLP

(57) ABSTRACT

Certain aspects of the present disclosure relate to wireless communications, and more particularly, to techniques for phase noise (PN) mitigation on multiple component carriers (CCs). A method that may be performed by a user equipment (UE) includes estimating impairments (e.g., common phase error (CPE) and/or inter-carrier interference (ICI)) caused by PN for only a first CC configured for the UE, wherein the first CC is configured with pilots for PN mitigation and mitigating the PN on each CC for all CCs configured for the UE based, at least in part, on the estimated impairments for the first CC.

27 Claims, 12 Drawing Sheets

400A

| Scheduled MCS | Time Density ($L_{PT-RS}$) |
|---|---|
| $I_{MCS}$ < ptrs -MCS1 | PT-RS is not present |
| ptrs -MCS1 ≤ $I_{MCS}$ < ptrs -MCS2 | 4 |
| ptrs -MCS2 ≤ $I_{MCS}$ < ptrs -MCS3 | 2 |
| ptrs -MCS3 ≤ $I_{MCS}$ < ptrs -MCS4 | 1 |

Time density of a PT-RS as a function of scheduled MCS

| Scheduled Bandwidth | Frequency Density ($K_{PT-RS}$) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

Frequency density of a PT-RS as a function of scheduled bandwidth

ESTIMATE, BY A USER EQUIPMENT (UE), IMPAIRMENTS CAUSED BY PHASE NOISE (PN) FOR ONLY A FIRST COMPONENT CARRIER (CC) CONFIGURED FOR THE UE, WHEREIN THE FIRST CC IS CONFIGURED WITH PILOTS FOR PN MITIGATION

↓

810

MITIGATE, BY THE UE, THE PN ON EACH CC FOR ALL CCS CONFIGURED FOR THE UE BASED, AT LEAST IN PART, ON THE ESTIMATED IMPAIRMENTS FOR THE FIRST CC

905
RECEIVE, BY A NETWORK ENTITY, FROM A USER EQUIPMENT (UE), AN INDICATION OF A CAPABILITY OF THE UE TO MITIGATE PHASE NOISE (PN) ON EACH COMPONENT CARRIER (CC) FOR ALL CCs CONFIGURED FOR THE UE WHEN ONLY ONE CC CONFIGURED FOR THE UE IS CONFIGURED WITH PILOTS FOR PN MITIGATION

910
CONFIGURE, BY THE NETWORK ENTITY, A FIRST CC CONFIGURED FOR THE UE WITH THE PILOTS FOR PN MITIGATION IN ACCORDANCE WITH THE CAPABILITY

FIG. 9

PHASE NOISE (PN) MITIGATION PILOT ALLOCATION ON A SINGLE COMPONENT CARRIER (CC) FOR PN MITIGATION ON MULTIPLE CCS

BACKGROUND

Field of the Disclosure

Aspects of the present disclosure relate to wireless communications, and more particularly, to techniques for phase noise (PN) mitigation.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), TRP, etc. A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

One or more aspects of the subject matter described in this disclosure can be implemented in a method for wireless communications by a user equipment (UE). The method generally includes estimating impairments caused by phase noise (PN) for only a first component carrier (CC) configured for the UE, wherein the first CC is configured with pilots for PN mitigation; and mitigating the PN on each CC for all CCs configured for the UE based, at least in part, on the estimated impairments for the first CC.

One or more aspects of the subject matter described in this disclosure can be implemented in a method for wireless communications by a network entity. The method generally includes receiving, from a UE, an indication of a capability of the UE to mitigate PN on each CC for all CCs configured for the UE when only one CC configured for the UE is configured with pilots for PN mitigation; and configuring a first CC configured for the UE with the pilots for PN mitigation in accordance with the capability.

One or more aspects of the subject matter described in this disclosure can be implemented in an apparatus for wireless communication by a UE. The apparatus generally includes a memory and at least one processor coupled with the memory. The at least one processor coupled with the memory is generally configured to estimate impairments caused by PN for only a first CC configured for the UE, wherein the first CC is configured with pilots for PN mitigation; and mitigate the PN on each CC for all CCs configured for the UE based, at least in part, on the estimated impairments for the first CC.

One or more aspects of the subject matter described in this disclosure can be implemented in an apparatus for wireless communication by a network entity. The apparatus generally includes a memory and at least one processor coupled with the memory. The at least one processor coupled with the memory is generally configured to receive, from a UE, an indication of a capability of the UE to mitigate PN on each CC for all CCs configured for the UE when only one CC configured for the UE is configured with pilots for PN mitigation; and configure a first CC configured for the UE with the pilots for PN mitigation in accordance with the capability.

One or more aspects of the subject matter described in this disclosure can be implemented in an apparatus for wireless communication. The apparatus generally includes means for estimating impairments caused by PN for only a first CC configured for the UE, wherein the first CC is configured with pilots for PN mitigation; and means for mitigating the PN on each CC for all CCs configured for the UE based, at least in part, on the estimated impairments for the first CC.

One or more aspects of the subject matter described in this disclosure can be implemented in an apparatus for wireless communication. The apparatus generally includes means for receiving, from a UE, an indication of a capability of the UE to mitigate PN on each CC for all CCs configured for the UE when only one CC configured for the UE is configured with pilots for PN mitigation; and means for configuring a first CC configured for the UE with the pilots for PN mitigation in accordance with the capability.

One or more aspects of the subject matter described in this disclosure can be implemented in a computer readable medium having computer executable code stored thereon. The computer readable medium having computer executable code stored thereon generally includes code for estimating impairments caused by PN for only a first CC configured for the UE, wherein the first CC is configured with pilots for PN mitigation; and code for mitigating the PN on each CC for all CCs configured for the UE based, at least in part, on the estimated impairments for the first CC.

One or more aspects of the subject matter described in this disclosure can be implemented in a computer readable medium having computer executable code stored thereon. The computer readable medium having computer executable code stored thereon generally includes code for receiving, from a UE, an indication of a capability of the UE to mitigate PN on each CC for all CCs configured for the UE when only one CC configured for the UE is configured with pilots for PN mitigation; and code for configuring a first CC configured for the UE with the pilots for PN mitigation in accordance with the capability.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure, and the description may admit to other equally effective aspects.

FIG. 4A illustrates an example table of time density parameters for phase tracking reference signals (PTRSs), in accordance with certain aspects of the present disclosure.

FIG. 4B illustrates an example table of frequency density parameters for PTRSs, in accordance with certain aspects of the present disclosure, in accordance with certain aspects of the present disclosure.

FIG. 8 is a flow diagram illustrating example operations for wireless communication by a UE, in accordance with certain aspects of the present disclosure.

FIG. 9 is a flow diagram illustrating example operations for wireless communication by a network entity, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
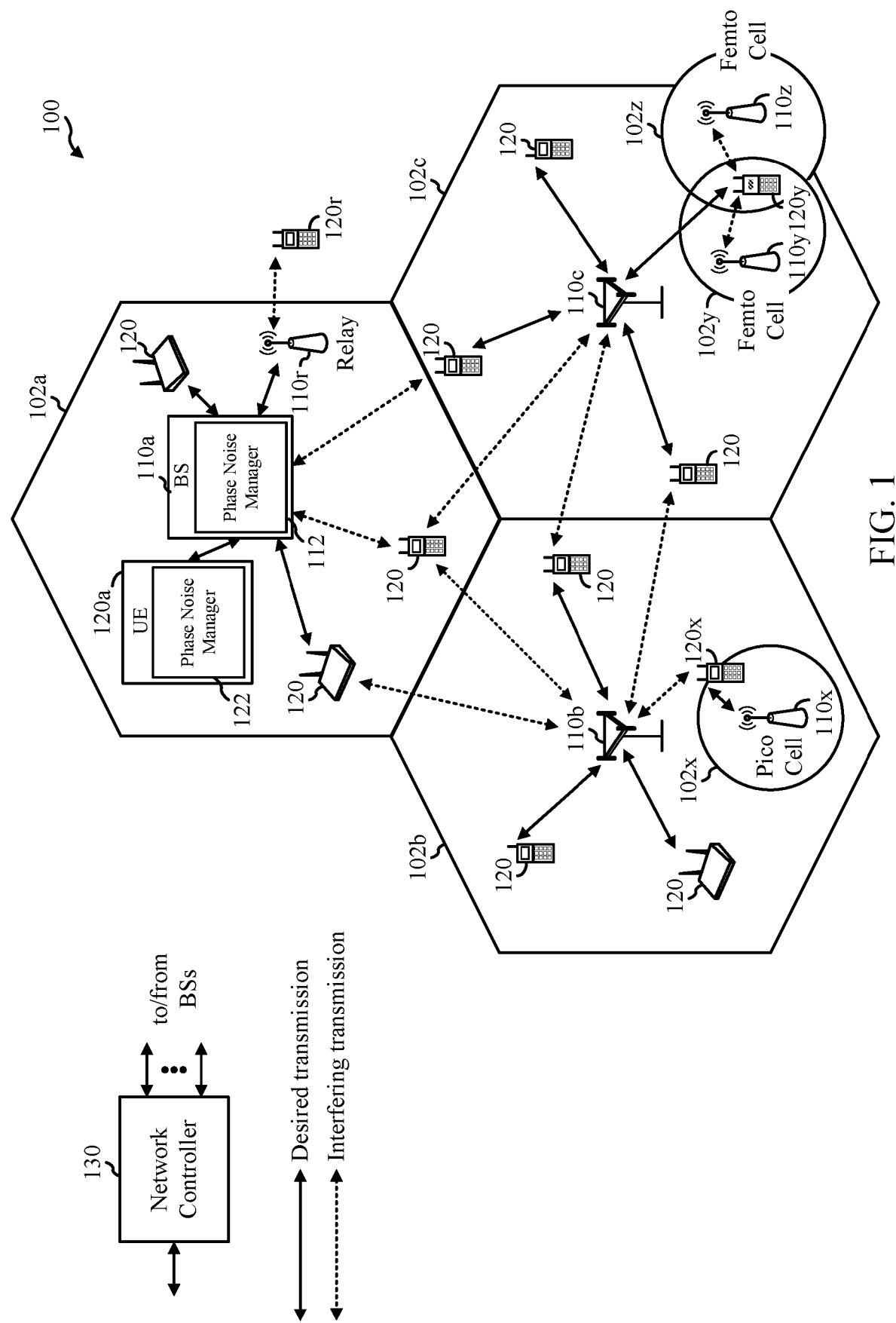
FIG. 1 is a block diagram conceptually illustrating an example telecommunications system, in accordance with certain aspects of the present disclosure.

Aspects of the present disclosure provide techniques for phase noise (PN) mitigation pilot allocation on a single component carrier (CC) for PN mitigation on multiple CCs (e.g., configured for the same user equipment (UE)). In particular, aspects of the present disclosure provide techniques for (1) PN estimation on a single CC configured with pilots for PN mitigation and (2) correction of the PN on multiple CCs based, at least in part, on the PN estimated for the single CC. PN mitigation pilot allocation may include the allocation of (1) phase tracking reference signals (PTRS) pilots, (2) enhanced PTRS (ePTRS) pilots, (3) data-aided PTRS pilots, or any other PN related pilots on a single CC configured for a UE.

Techniques presented herein for PN mitigation may decrease PN related pilot overhead without compromising the estimation quality of impairments (e.g., common phase error (CPE) when PTRS pilots are allocated and CPE and inter-carrier interference (ICI) when ePTRS pilots are allocated) given a single CC-based estimation is capable of providing impairments estimation for all other simultaneously transmitted CCs that are not configured with pilots for PN mitigation. Further, spectral efficiency, e.g., a measure of how efficiently a limited frequency spectrum is utilized, is related to overhead, thus when the overhead is decreased, spectral efficiency may be increased (and similarly reliability of transmissions). Techniques presented herein may also allow for lower UE complexity given less processing at the UE is required to mitigate PN across all CCs configured for the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as Long Term Evolution (LTE), code division multiple access (CDMA), time division multiple access (TDMA), frequency division multiple access (FDMA), orthogonal frequency division multiple access (OFDMA), single-carrier frequency division multiple access (SC-FDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as New Radio (NR) (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine-type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., a New Radio (NR)/5G network), in which aspects of the present disclosure may be performed. For example, the wireless communication network 100 may include a network entity (e.g., such as base station (BS) 110a) performing operations 900 of FIG. 9 for configuring a component carrier (CC) with the pilots for phase noise (PN) mitigation, wherein the CC is configured for a user equipment (UE) (e.g., such as UE 120a) performing operations 800 of FIG. 8 to mitigate PN on all CCs configured for the UE. For example, UE 120a includes a PN manager 122 and the BS 110a includes a PN manager 112. PN manager 122 and PN manager 112 may be configured for PN mitigation, in accordance with aspects of the present disclosure.

As illustrated in FIG. 1, the wireless communication network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with a BS 110*a* and a UE 120*r* to facilitate communication between the BS 110*a* and the UE 120*r*. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the UL and DL and include support for half-duplex operation using time division duplex (TDD). Beamforming may be supported and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a BS, Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P)

network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink (DL) and/or uplink (UL). A finely dashed line with double arrows indicates interfering transmissions between a UE and a BS. Other lines show component to component (e.g., UE to UE) communication options.

Figure 2:
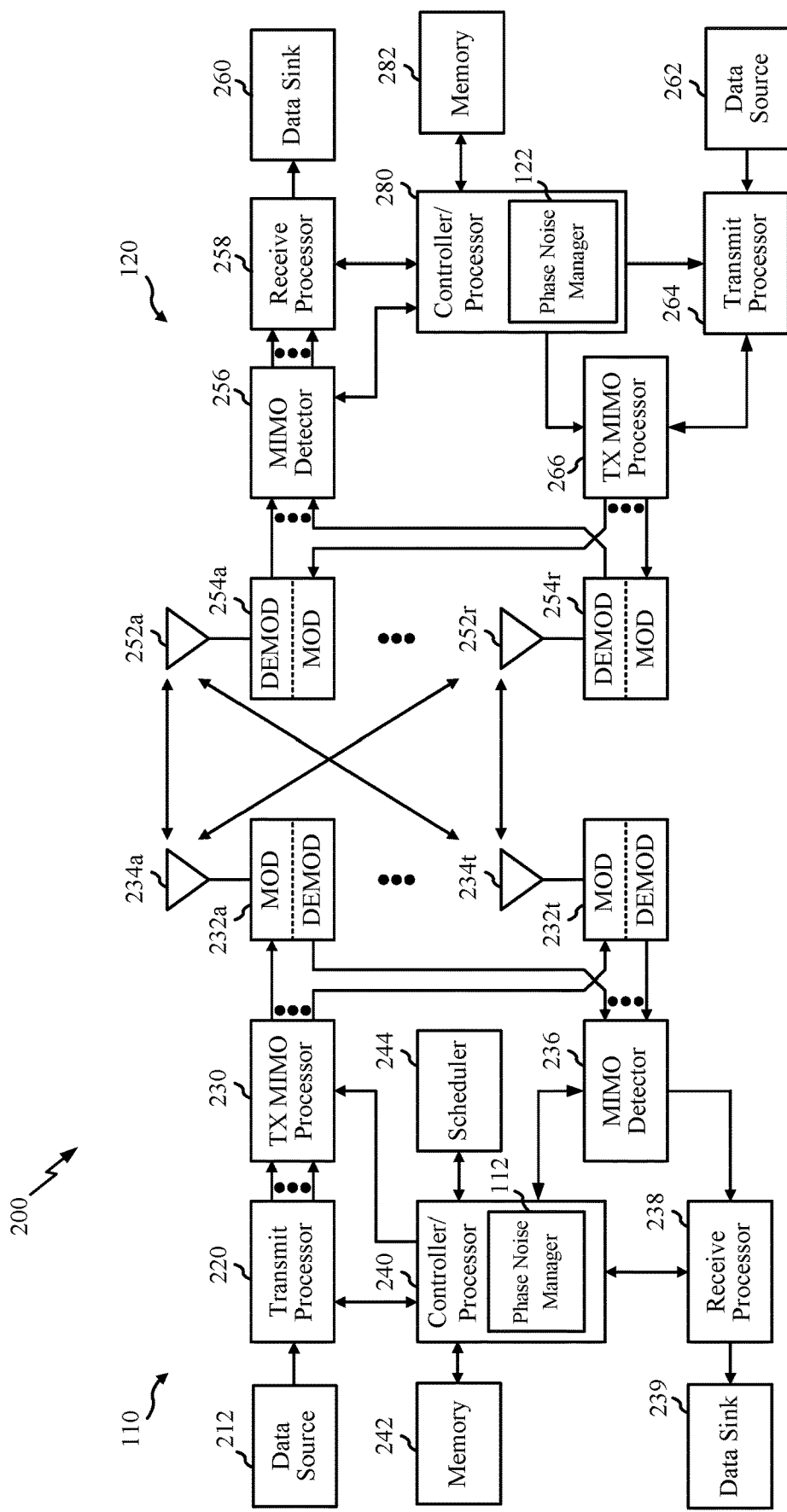
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1) which may be used to implement aspects of the present disclosure. For example, antennas 252, processors 266, 258, 264, and/or controller/processor 280, which includes PN manager 122, of UE 120 may be used to perform operations 800 of FIG. 8, while antennas 234, processors 220, 230, 238, and/or controller/processor 240, which includes PN manager 112, of BS 110 may be used to perform operations 900 of FIG. 9.

At BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. Processor 220 may also generate reference symbols, e.g., for the primary synchronization signal (PSS), secondary synchronization signal (SSS), and cell-specific reference signal (CRS). A transmit (TX) MIMO processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. DL signals from modulators in transceivers 232a-232t may be transmitted via the antennas 234a-234t, respectively.

At UE 120, antennas 252a-252r may receive DL signals from BS 110 and may provide received signals to demodulators (DEMODs) in transceivers 254a-254r, respectively. Each demodulator in transceivers 254a-254r may condition (e.g., filter, amplify, down convert, and digitize) a respective received signal to obtain input samples. Each demodulator may further process input samples (e.g., for OFDM, etc.) to obtain received symbols. A MIMO detector 256 may obtain received symbols from all demodulators in transceivers 254a-254r, perform MIMO detection on the received symbols if applicable, and provide detected symbols. A receive processor 258 may process (e.g., demodulate, deinterleave, and decode) the detected symbols, provide decoded data for UE 120 to a data sink 260, and provide decoded control information to a controller/processor 280.

On the UL, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to BS 110. At BS 110, UL signals from UE 120 may be received by the antennas 234, processed by the modulators 232, detected by a MIMO detector 236 if applicable, and further processed by a receive processor 238 to obtain decoded data and control information sent by UE 120. The receive processor 238 may provide the decoded data to a data sink 239 and the decoded control information to the controller/processor 240.

The controllers/processors 240 and 280 may direct operations at BS 110 and UE 120, respectively. Processor 240 and/or other processors and modules at BS 110 may perform or direct execution of processes for techniques described herein. The memories 242 and 282 may store data and program codes for BS 110 and UE 120, respectively. A scheduler 244 may schedule UEs for data transmission on the DL and/or UL.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Figure 3:
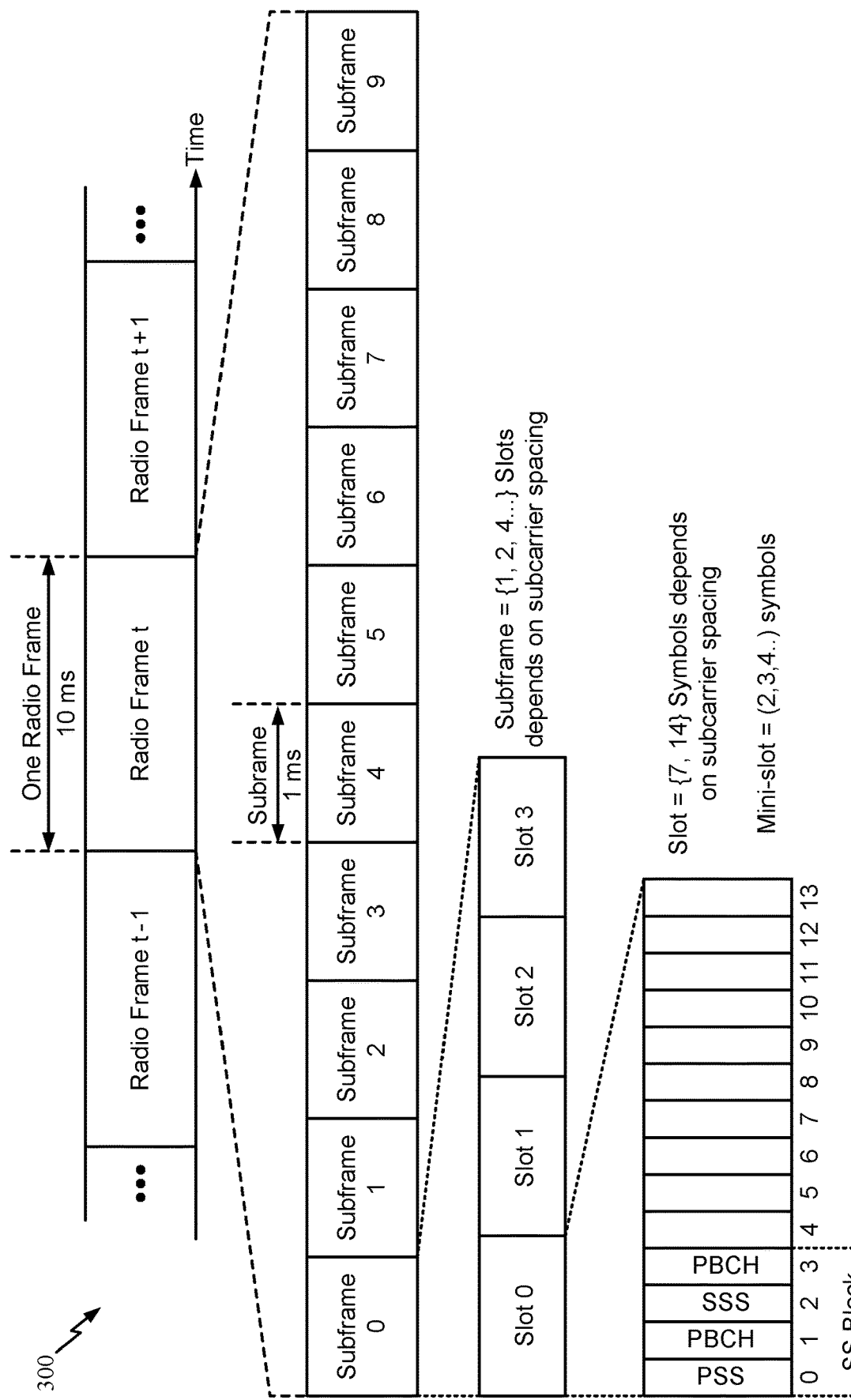
FIG. 3 illustrates an example of a frame format for a new radio (NR) system, in accordance with certain aspects of the present disclosure.

FIG. 3 illustrates an example of a frame format 300 for a new radio (NR) system, in accordance with certain aspects of the present disclosure. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Phase Tracking Reference Signal (PTRS) and Enhanced PTRS (ePTRS) Design

5G New Radio (NR) is a global 5G standard for a new orthogonal frequency division multiplex (OFDM)-based air interface designed to support the wide variation of 5G device-types, services, deployments, and spectrum. One transformation taking place with 5G NR is the move towards higher millimeter wave (mmWave) frequencies as an approach to significantly boost the capacity of 5G. However, mmWave devices and network access points (APs) suffer from severe phase noise (PN) (e.g., small random phase variations) due, at least in part, to the mismatch of transmitter and receiver frequency oscillators. Random PN and frequency offset are generated by non-ideal oscillators at both receiver and transmitter. In other words, PN is caused by noise in the active components and lossy elements which is up-converted to the carrier frequency.

As is known in the art, PN is a multiplicative process in the time domain which results in cyclic convolution of a physical downlink shared channel (PDSCH), with corresponding PN taps in a frequency domain. Uncompensated PN leads to common phase error (CPE) and inter-carrier interference (ICI) (also referred to as inter-symbol-interference) related error. CPE and ICI can be significant in some scenarios where the integrated PN (IPN) is strong enough.

PN related ICI is prevalent in most high signal-to-noise ratio (SNR) regions which are associated with high modulation and coding scheme (MCS) options and high modulation orders. ICI taps (also referred to as ICI sequences) represent the frequency domain PN response. ICI taps/sequences may be different per symbol, but are the same for all resource elements (REs). Further, ICIs taps/sequences are typically the same for all receive (RX)/transmit (TX) antennas.

In this regard, phase tracking reference signals (PTRSs) were introduced as PN mitigation pilots in 3rd Generation Partnership Project (3GPP) Release 15, to serve the purpose of PN and residual frequency and offset estimation and correction per slot. In particular, PTRSs may track a phase of an oscillator at a transmitter and a receiver of the UE and mitigate the performance loss due to the PN. The terms PTRSs and PTRS tones may be used interchangeably herein.

The phase tracking may enable suppression of PN and CPE, particularly at higher (e.g., mmWave) frequencies. For example, a typical mmWave fame has only one demodulation reference signal (DMRS) symbol; thus, a frequency tracking loop (FTL) experiences some residual frequency error. In order to track the phase that is developed within the slot because of the existing FTL residual error so that it may be fixed, PTRSs may be used.

Time and frequency-domain resources for PTRS tones may be dynamically determined. For example, for single user multiple-input multiple-output (SU-MIMO), radio resource control (RRC) signaling may provide predefined configurations for the PTRSs based on a TimeDensity ($L_{PT-RS}$) and FrequencyDensity ($K_{PT-RS}$), which may be specified by parameters L and K, respectively. The signaling may be provided via PTRS-DownlinkConfig and PTRS-UplinkConfig.

FIG. 4A illustrates an example table of time density parameters for PTRSs, in accordance with certain aspects of the present disclosure. As shown in Table 400A of FIG. 4A, the time density of a PTRS may be determined as a function of the scheduled modulation and coding scheme (MCS). In particular, TimeDensity, parameter L, may indicate threshold values ptrs-MCSi, i=1, 2, 3, 4 as illustrated in table 400A of FIG. 4A. For cyclic prefix orthogonal frequency-division multiplexing (CP-OFDM), TimeDensity, parameter L, may include every symbol, every second symbol, or every fourth symbol, and more specifically, TimeDensity, parameter L, may be equal to one, two, or four. When L equals one, PTRS tones are sent on every physical downlink shared channel (PDSCH). When L equals two, PTRS tones are sent on one symbol for every two PDSCH symbols. When L equals four, PTRS tones are sent on one symbol for every four PDSCH symbols.

FIG. 4B illustrates an example table of frequency density parameters for PTRSs, in accordance with certain aspects of the present disclosure. As shown in table 400B of FIG. 4B, the frequency density of PTRS may be determined as a function of a scheduled bandwidth (e.g., in number of RBs). In particular, frequencyDensity, parameter K, may indicate scheduled bandwidth threshold values NRB,i, i=0, 1 as illustrated in Table 400B of FIG. 4B. For CP-OFDM, FrequencyDensity, parameter K, may include may include occupying at least one subcarrier in every second resource block (RB) or every fourth RB, and more specifically, FrequencyDensity, parameter K, may be equal to two or four. When K equals two, one PTRS tone is sent every 2 RBs. When K equals four, one PTRS tone is sent every 4 RBs.

For both uplink (UL) and DL PTRS, PTRS allocation in the frequency domain is determined by an offset parameter, $k_{ref}$, which indicates the subcarrier offset for UL PTRS and DL PTRS, respectively. Offset parameter, $k_{ref}$, depends on a DMRS port associated with a PTRS port.

Figure 5:
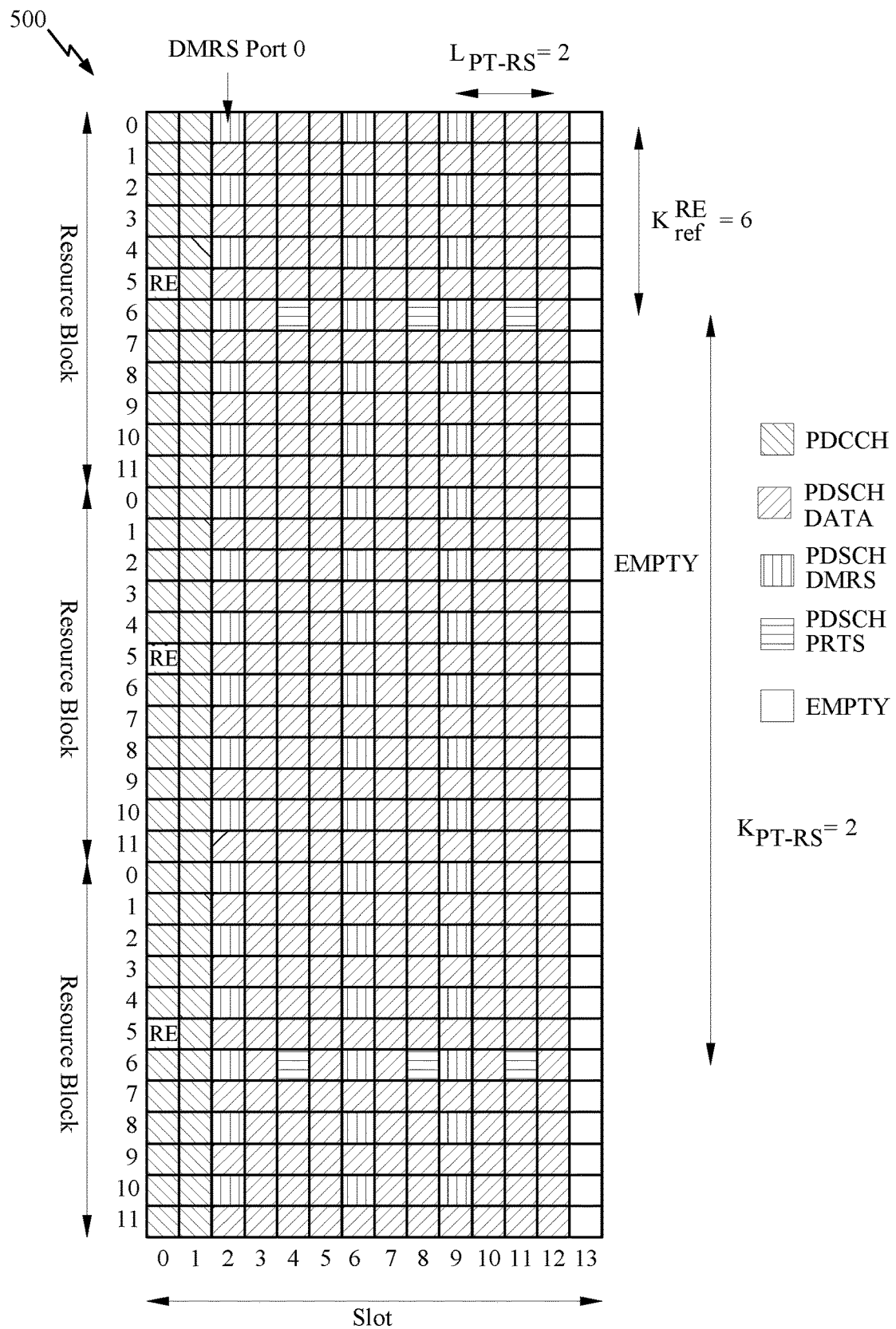
FIG. 5 illustrates an example of PTRS tones in multiple resource blocks (RBs), in accordance with certain aspects of the present disclosure.

FIG. 5 illustrates an example 500 of PTRS tones in multiple RBs, in accordance with certain aspects of the present disclosure. As shown in FIG. 5, with a TimeDensity, $L_{PT-RS}$, of two, one PTRS tone is sent every two symbols, and with a FrequencyDensity, $K_{PT-RS}$, of two, one PTRS tone is sent every two RBs. Further as shown in FIG. 5, with an offset parameter, $k_{ref}$, of six, PTRS tones are offset six resource elements (REs) from DMRS Port 0.

While regular PTRSs are just one of the pilots introduced for PN estimation and correction, another PN mitigation pilot includes enhanced PTRSs (ePTRSs). While regular PTRSs allow for CPE correction only, ePTRSs where used, may address both CPE and ICI.

As explained, when severe PN exists, CPE and ICI correction is required in order to efficiently operate in high SNR. In contrast to CPE which theoretically does not cause ICI and can be estimated using interleaved pilots (e.g. the regular/standardized PTRS), ICI estimation and correction requires some sort of contiguous pilot in the frequency domain with minimal length in order to capture the ICI effect. In order to remove or significantly decrease the ICI floor caused by PN, ePTRS may be used. A waveform of ePTRS is designed to be continuous in the frequency domain and spanning enough REs to capture a significant portion of the PN response in the frequency domain (ICI taps) for PN estimation and correction.

Figure 6:
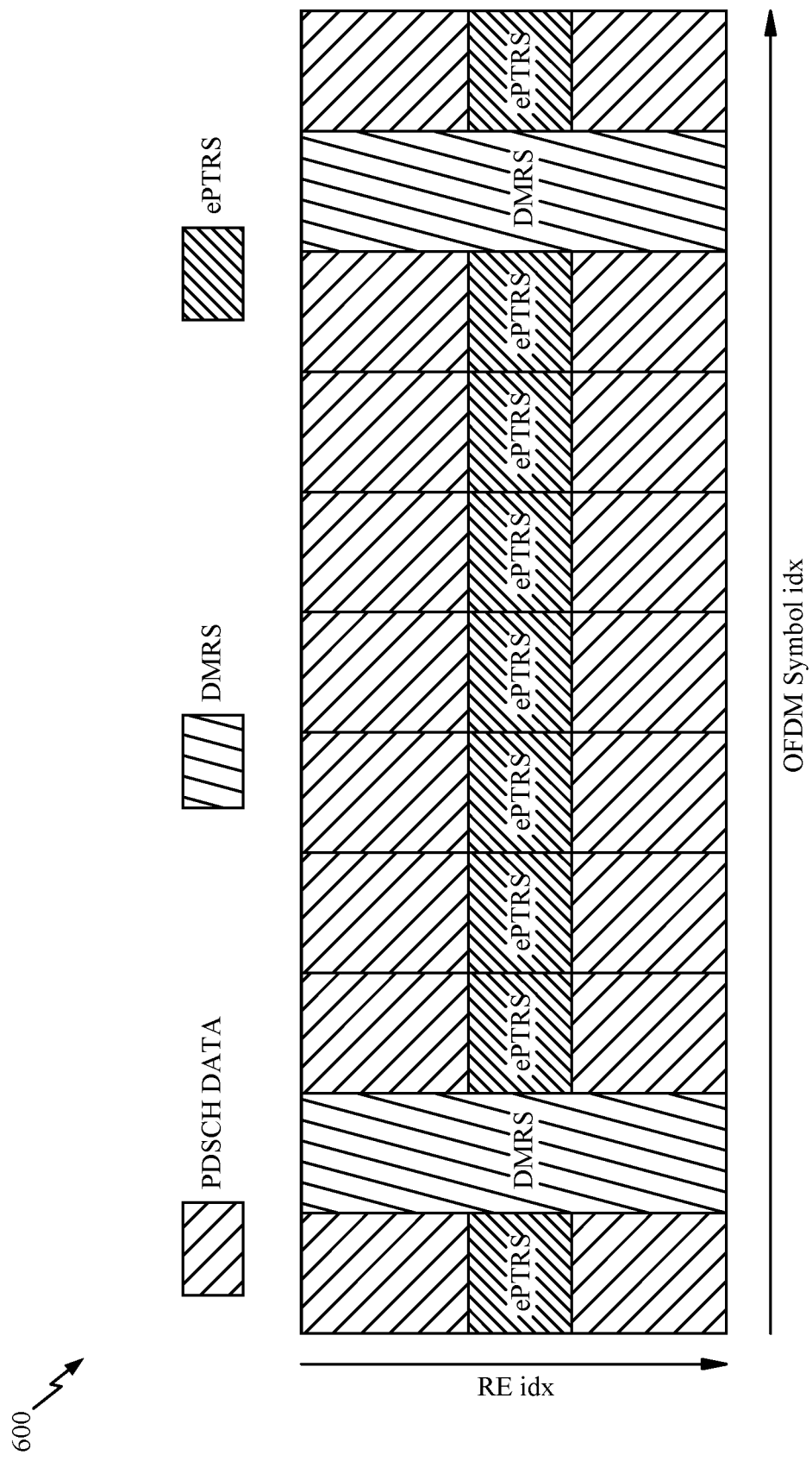
FIG. 6 illustrates an example allocation of enhanced PTRS (ePTRS) tones on a component carrier (CC), in accordance with certain aspects of the present disclosure.

FIG. 6 illustrates an example allocation 600 of ePTRS tones on a component carrier (CC), in accordance with certain aspects of the present disclosure. As shown in FIG. 6, ePTRS data is allocated on a contiguous band in the frequency domain (unlike regular PTRS illustrated in FIG. 5). Further, both ePTRS and PDSCH data are OFDM modulated.

Carrier aggregation (CA) is a technique used in wireless communication whereby multiple frequency bands (called component carriers) are aggregated for higher peak rates and increased cell coverage. For example, base stations (BSs) and user equipments (UEs) may use spectrum up to Y MHz (e.g., 5, 10, 15, 20, 100, 400, and other megahertz (MHz)) bandwidth per CC allocated in a CA of up to a total of Yx MHz (x carriers) used for transmission in each direction. The CCs may or may not be adjacent to each other. Allocation of CCs may be asymmetric with respect to DL and UL (e.g., more or fewer carriers may be allocated for DL than for UL). The CCs may include a primary component carrier and one or more secondary component carriers. A primary component carrier (PCC) may be referred to as a primary cell (PCell) and a secondary component carrier (SCC) may be referred to as a secondary cell (SCell).

PN mitigation pilots, including both PTRS and ePTRS pilots, may be allocated on each CC configured for a UE to estimate and correct PN on each CC. However, allocation of PN pilots on each CC configured for the UE may significantly increase overhead. Accordingly, techniques for pilot allocation with reduced overhead in multi-CC scenarios, without compromising the estimation quality of PN, is desired.

Example Phase Noise (PN) Mitigation Pilot Allocation on a Single Component Carrier (CC) for PN Mitigation on Multiple CCs Aspects of the present disclosure provide techniques for PN mitigation pilot allocation on a single component carrier (CC) for PN mitigation on multiple CCs (e.g., configured for the same user equipment (UE)). In particular, aspects of the present disclosure provide techniques for (1) PN estimation on a single CC configured with pilots for PN mitigation and (2) correction of the PN on multiple CCs based, at least in part, on the PN estimated for the single CC. Such allocation may be used in scenarios involving carrier aggregation (CA), and more specifically, scenarios involving the simultaneous multi-CC transmission of a physical downlink shared channel (PDSCH).

PN mitigation pilot allocation may include the allocation of (1) phase tracking reference signals (PTRS) pilots on a single CC configured for a UE or (2) enhanced PTRS (ePTRS) pilots on a single CC configured for a UE. PTRS pilots may include regular PTRS pilots or data-aided PTRS pilots. Configuring PTRS pilots at the single CC may allow for estimation of common phase error (CPE), as described above, for mitigation on multiple CCs. On the other hand, configuring ePTRS pilots at the single CC may allow for estimation of not only CPE, but also inter-carrier interference (ICI), as described above, for mitigation on multiple CCs. Although PN estimation and correction described herein concerns the use of PTRSs and ePTRSs, any other suitable PN mitigation pilots may be considered.

Single CC PN pilot allocation may be used to correct the effect of PN across all CCs configured for a UE given PN impairment in the time domain and frequency domain is the same for all CCs. For example, in the downlink (DL), it is generally assumed that the dominating PN is generated at the UE-side (e.g., RX oscillator/phase locked loop (PLL). Under this assumption, the formulation for the received signal in frequency domain, for each CC, is represented by:

$$Y_k = I \otimes (H_k * P_k * X_k * N_k)$$

where $Y_k$ is the received signal, $H_k$ is the channel matrix, $P_k$ is the precoding matric, $X_k$ is the transmitting signal, $N_k$ is the additive Gaussian noise, I is the frequency domain PN frequency response, and sub-script k indicates the corresponding notation is the for the k-th CC (e.g., on the k-th CC). As shown, all parameters which make up the above equation are specific to each CC except for the frequency domain PN frequency response, I, which does not include a k sub-script/index. This is because the frequency domain PN frequency response, I, is generated by the UE, and the UE generates the same I for all CCs. In other words, all CCs configured for the UE experience the same frequency domain PN frequency response, I. The same is true for PN introduced in the time domain, i.e., all CCs configured for the UE (or the full received bandwidth) experience the same PN impairment in the time domain. For this reason, CPE (when using only PTRS pilots) and ICI (when using ePTRS pilots) estimation may be performed based only on samples related to a single CC, while the corresponding PN correction may be performed based on these estimations for all of the CCs configured for the UE.

Such allocation of PN mitigation pilots only on a single CC in the case of multiple CCs configured for UE, may decrease PN related pilot overhead without compromising the estimation quality of the CPE (and ICI when using ePTRS) given a single CC-based estimation is capable of providing CPE (and ICE when using ePTRS) estimation for all other simultaneously transmitted CCs that are not configured with pilots for PN mitigation. Further, spectral efficiency, e.g., a measure of how efficiently a limited frequency spectrum is utilized, is related to overhead, thus when the overhead is decreased, spectral efficiency may be increased (and similarly reliability of transmissions). Aspects of the present disclosure may also allow for lower UE complexity given less processing at the UE is required to mitigate PN across all CCs configured for the UE. Such reduction in pilot overhead is illustrated in the example PN pilot allocation of FIG. 7.

Figure 7:
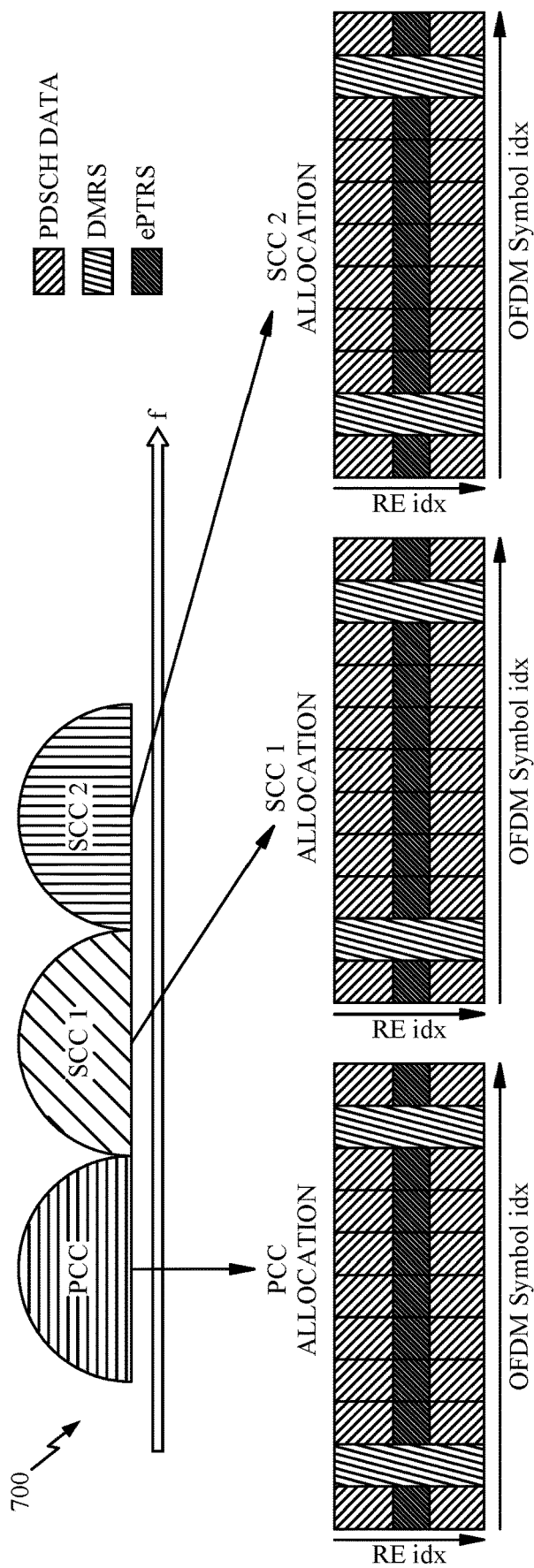
FIG. 7 illustrates an example allocation of phase noise (PN) mitigation pilots on a primary CC (PCC) for PN estimation and correction, in accordance with certain aspects of the present disclosure.

FIG. 7 illustrates an example allocation 700 of PN mitigation pilots on a primary CC (PCC) for PN estimation and correction, in accordance with certain aspects of the present disclosure. As shown in FIG. 7, a UE may be configured with three CCs (e.g., simultaneously transmitted CCs): one PCC and two secondary CCs (e.g., SCC 1 and SCC 2). According to certain aspects of the present disclosure, PN mitigation pilots, in this case ePTRS pilots, may be allocated only on the PCC and not on SCC 1, nor SCC 2. The ePTRS pilot allocation on the PCC may be used to estimate the CPE and ICI, which is common among the PCC, SCC 1, and SCC2. Based on these estimations at the PCC, PN related CPE and ICI may be mitigated on the PCC, SCC 1, and SCC 2

Although FIG. 7 illustrates ePTRS pilot allocation on the PCC, other scenarios may involve ePTRS pilot allocation on either SCC 1 or SCC 2, or on any other single CC configured for the UE. Additionally, where PTRS pilots are allocated on PCC instead of ePTRS pilots, as shown in FIG. 7, CPE estimation on the PCC may be performed on the PCC and such estimation may be used to mitigate PN related CPE on the PCC, SCC 1, and SCC 2.

For the example allocation 700 illustrated in FIG. 7, the overall PTRS overhead reduction percentage (%) may be:

$$TPUT_{gain} = \frac{(N_{CC}-1)}{N_{CC}} * \frac{RE_{PTRS}}{RE_{PDSCH}}$$

where $N_{CC}$ is the number of CCs, $RE_{PTRS}$ is the number of PTRS resource elements (REs), and $RE_{PDSCH}$ is the number of PDSCH REs. For example, in FIG. 7, where the number of CCs used for the simultaneous transmission of PDSCH is three, e.g., $N_{CC}=3$, and the maximum allowed (per 3GPP specification) PTRS density is approximately 4%, e.g., $$\frac{RE_{PTRS}}{RE_{PDSCH}} \approx 4\%,$$

the PTRS overhead reduction may be about 3%

$$(\text{e.g., } TPUT_{gain} = \frac{(3-1)}{3} * 4\% = 66.67\% * 4\% = 2.67\% \approx 3\%.$$

Accordingly, as illustrated by the equation, overhead may be reduced where PN mitigation pilots are allocated on only a single CC for PN mitigation on multiple CCs.

FIG. 8 is a flow diagram illustrating example operations for wireless communication by a UE, in accordance with certain aspects of the present disclosure. Operations 800 may be performed, for example, by UE 120a in wireless communication network 100 of FIG. 1.

Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 800 begin, at block 805, by a UE estimating impairments caused by PN for only a first CC configured for the UE, wherein the first CC is configured with pilots for PN mitigation. In certain aspects, the pilots for PN mitigation configured at the first CC may include PTRS pilots, wherein the PTRS pilots include regular PTRS pilots or data-aided PTRS pilots. Accordingly, where the first CC is configured with PTRS pilots, estimating the impairments includes estimating the CPE. In certain aspects, the pilots for PN mitigation configured at the first CC may include ePTRS pilots. Accordingly, where the first CC is configured with ePTRS pilots, estimating the impairments includes estimating the CPE and ICI.

In certain aspects, the CCs configured for the CCs configured for the UE include a PCC and one or more SCCs, and the first CC configured with pilots for PN mitigation is the PCC. In certain aspects, the one or more SCCs may not configured with pilots for PN mitigation.

At block 810, the UE mitigates the PN on each CC for all CCs configured for the UE based, at least in part, on the estimated impairments for the first CC.

FIG. 9 is a flow diagram illustrating example operations for wireless communication by a network entity, in accordance with certain aspects of the present disclosure. Operations 900 may be performed, for example, by BS 110a in wireless communication network 100 of FIG. 1. Operations 900 may be complementary operations by the network entity to the operations 800 performed by the UE.

Operations 900 may be implemented as software components that are executed and run on one or more processors (e.g., controller/processor 240 of FIG. 2). Further, the transmission and reception of signals by the network entity in operations 900 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 900 begin, at block 905, by the network entity receiving, from a user equipment (UE), an indication of a capability of the UE to mitigate phase noise (PN) on each CC for all CCs configured for the UE when only one CC configured for the UE is configured with pilots for PN mitigation.

At block 910, the network entity configures a first CC configured for the UE with the pilots for PN mitigation in accordance with the capability.

Figure 10:
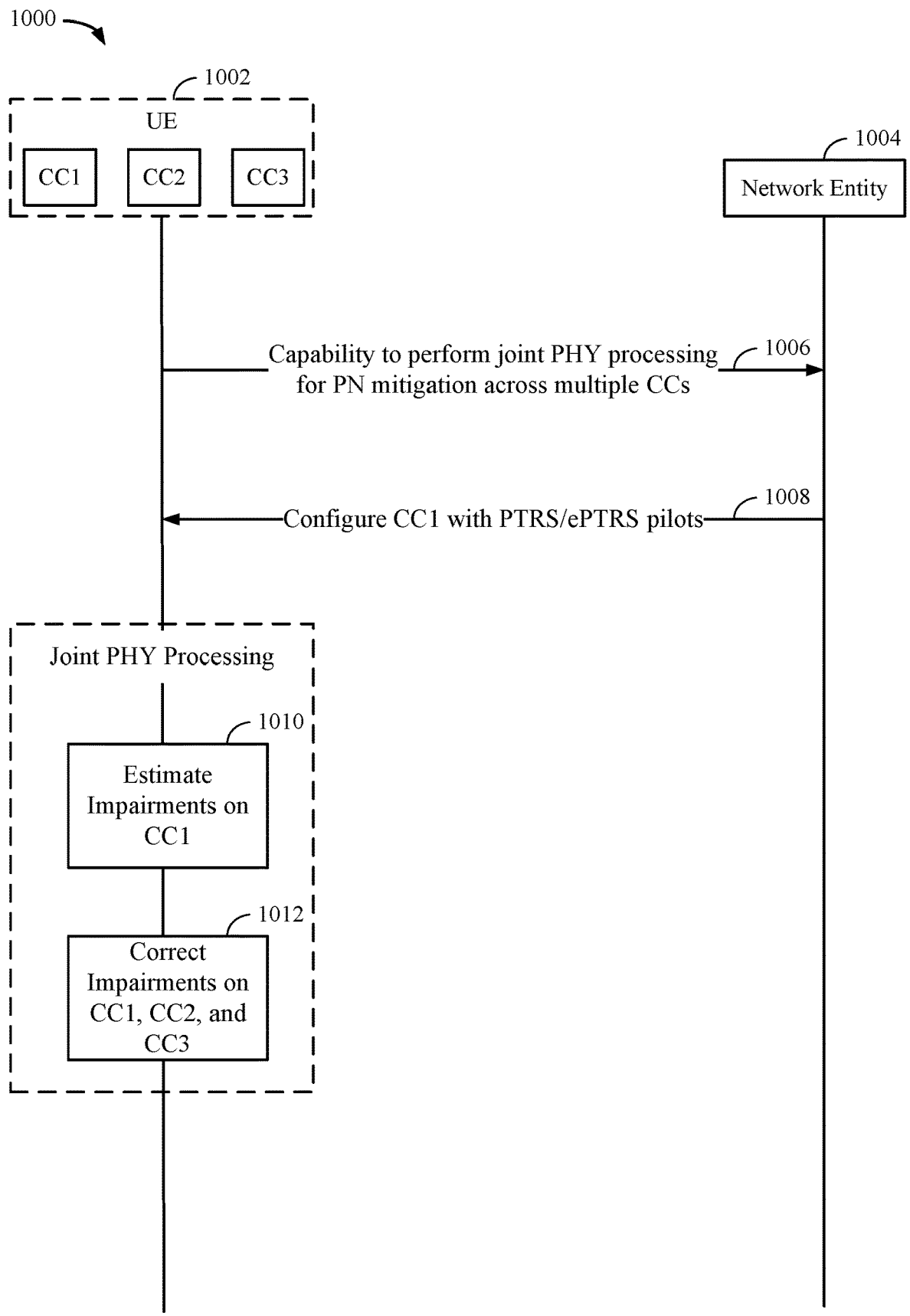
FIG. 10 is a call flow diagram illustrating example operations for PN mitigation across multiple CCs, in accordance with certain aspects of the present disclosure.

Operations 800 and 900 of FIGS. 8 and 9, respectively, may be understood with reference to call flow diagram 1000 of FIG. 10 which illustrates operations for PN mitigation across multiple CCs, in accordance with certain aspects of the present disclosure. As shown in FIG. 10, a UE 1002 may be configured with three CCs, namely CC1, CC2, and CC3. At 1006, UE 1002 may indicate to a network entity 1004 that UE 1002 is capable of performing joint physical (PHY) layer processing for PN mitigation across the multiple CCs configured for UE 1002 (e.g., CC1, CC2, and CC3). In other words, UE 1002 transmits, to network entity 1004, an indication of a capability of UE 1002 to mitigate the PN on each of CC1, CC2, and CC3 when only one CC among CC1, CC2, and CC3 is configured with pilots for PN mitigation (e.g., PTRS pilots, data-aided PTRS pilots, ePTRS pilots, or any other PN related pilots). As used herein, joint PHY processing refers to the joint process of PN mitigation for all CCs configured for the UE (e.g., correction of PN on multiple CCs).

UE 1002 may indicate this capability when UE 1002 is able to perform both (1) CPE (when using PTRS) or CPE and ICI (when using ePTRS) estimation based on only a single CC and (2) CPE (when using PTRS) or CPE and ICI (when using ePTRS) mitigation (or correction) for CPE/ICI impairment on all CCs based on the estimated CPE (when using PTRS) or CPE and ICI (when using ePTRS) for the single CC. UE 1002 may determine this capability based on whether or not CPE/ICI estimation performed on a PCC configured for UE 1002 may be used to correct CPE/ICI impairment on all CCs (e.g., the PCC and SCCs) configured for UE 1002. In other words, in some cases, UE 1002 may assume PN mitigation pilots are to be allocated on only the PCC configured for UE 1002 when making this determination.

At 1008, in response to receiving this indication, network entity 1004 configures a CC (also referred to herein as a first CC) configured for the UE with the pilots for PN mitigation in accordance with the capability. Network entity 1004 may configure a CC configured for the UE with the pilots for PN mitigation via radio resource control (RRC) signaling. The pilots configured at a CC of the UE may include PTRS pilots, data-aided PTRS pilots, ePTRS pilots, or any other PN related pilots.

In certain aspects, the CC configured with pilots for PN mitigation by network entity 1004, may be a PCC configured for UE 1002. For example, assuming CC1 is a PCC, CC2 is a first SCC, and CC3 is a second SCC configured for UE 1002, network entity 1004 may configure CC1 (e.g., the PCC) with the pilots for PN mitigation. Similarly, network entity 1004 may not configure CC2 (e.g., the first SCC), nor CC3 (e.g., the second SCC) with pilots for PN mitigation. In this way, only PN estimation (e.g., CPE, and in some cases ICI estimation) may only be performed on CC1, the PCC configured for UE 1002.

In certain aspects, the capability of UE 1002 to mitigate the PN on each CC configured for UE 1002 when only one CC configured for the UE is configured with pilots for PN mitigation may vary per bandwidth part (BWP). In other words, at 1006, UE 1002 may report this capability per BWP. This may be reported in the same way that other PTRS capabilities are currently reported (e.g., BandNR→Multiple-input-multiple-output (MIMO)-ParametersPerBand→New PTRS/ePTRS capability). Accordingly, at 1008, in response to receiving this indication for a specific BWP, network entity 1004 may configure the indicated BWP with the pilots for PN mitigation. The BWP may correspond to a CC (e.g., first CC) for which PN estimation is to be performed.

Once a CC and/or BWP is configured with PN mitigation pilots for PN estimation and correction, UE 1002 may perform joint PHY processing. Specifically, at 1010, UE 1002 may estimate impairments, e.g., CPE (when PTRS pilots are allocated) or CPE and ICI (when ePTRS pilots are allocated) for the CC configured with pilots for PN mitigation. In this example, where CC1 is the CC configured with pilots for PN mitigation, UE 1002 may estimate CPE (and ICI, in cases where the allocated pilots are ePTRS pilots) on CC1.

At 1012, UE 1002 may correct CPE (and ICI, in cases where the allocated pilots are ePTRS pilots) on each of CC1, CC2, and CC3 using the estimated CPE (and ICI, in cases where the allocated pilots are ePTRS pilots) on CC1, at 1010.

In certain aspects (not shown in FIG. 10), network entity 1004 may configure UE 1002 to assume the CC configured with pilots for PN mitigation is a PCC configured for the UE. Accordingly, UE 1002 may estimate impairments (e.g., CPE or CPE and ICI) caused by PN for only the PCC configured for UE 1002 (e.g., at 1010). Network entity 1004 may configure UE 1002 to assume the first CC configured with the pilots for PN mitigation is the PCC configured for the UE via RRC signaling.

In certain aspects (not shown in FIG. 10), network entity 1004 may configure more than one CC or BWP (e.g., multiple CCs or BWPs) with pilots for PN mitigation. In this case, network entity 1004 may configure UE 1002 with a rule to assume that the CC configured with the pilots for PN mitigation is a CC configured for UE 1002 having a largest PDSCH allocation size, such that UE 1002 estimates impairments caused by PN for only the CC configured for UE 1002 having the largest PDSCH allocation size. Network entity 1004 may configure UE 1002 with the rule via RRC signaling. Accordingly, prior to performing estimation of the impairments (e.g., CPE or CPE and ICI) at 1010 in FIG. 10, UE 1002 may measure PDSCH allocation size for the CCs configured for the UE 1002 (e.g., CC1, CC2, and CC3) and determine which CC has the largest PDSCH allocation size based on the measuring. Based on the rule configured for UE 1002, UE 1002 may assume the CC determined to have the largest PDSCH allocation size is the CC configured with the pilots for PN mitigation. UE 1002 may estimate impairments at 1010 for this determined CC. Configuring such a rule at UE 1002 may make UE 1002 aware that PN pilots will be allocated on a single CC, which is to be selected based on the (pre)configured rule.

In certain aspects, a UE may be hard coded to assume PN mitigation pilots are allocated only on the PCC configured for the UE. In this way, the UE may always assume PN pilots being allocated by a network entity are being allocated on the PCC configured for the UE. Accordingly, the UE may perform impairments estimation on the PCC and phase correction on all other CCs configured for the UE based on the estimated impairments for the PCC. In this case, a network entity may not need to (pre)configure the UE to assume the PN mitigation pilots are allocated on the PCC, nor configure the UE with a rule to assume the PN mitigation pilots are allocated on a CC having a largest PDSCH allocation size. Such an implementation, may reduce signaling overhead for PN mitigation on multiple CCs.

Aspects of the present disclosure may apply to both contiguous and non-contiguous intra-band CA. As is known in the art, contiguous intra-band CA may refer to contiguous CCs in a same frequency band (e.g., CCs belonging to the same operating frequency band, and having no gaps in between), and non-contiguous intra-band CA may refer to non-contiguous CCs in a same frequency band (e.g., CCs belonging to the same operating frequency band, but have a gap, or gaps, in between).

Aspects of the present disclosure may apply to any band/scenario that is limited by a PN impairment. For example, bands that may be limited by a PN impairment include frequency range 2 (FR2) bands (e.g., 24.25 gigahertz (GHz) to 52.6 GHz) and above, including a higher band referred to as frequency range 4 (FR4) (e.g., 52.6 GHz)-114.25 GHz). Another band/scenario that may be limited by a PN impairment includes frequency range 1 (FR1) bands with CPE/integrated access and backhaul (IAB), with a very high order quadrature amplitude modulation (QAM), such as 4096QAM or 2048QAM.

Example Wireless Communications Devices

Figure 11:
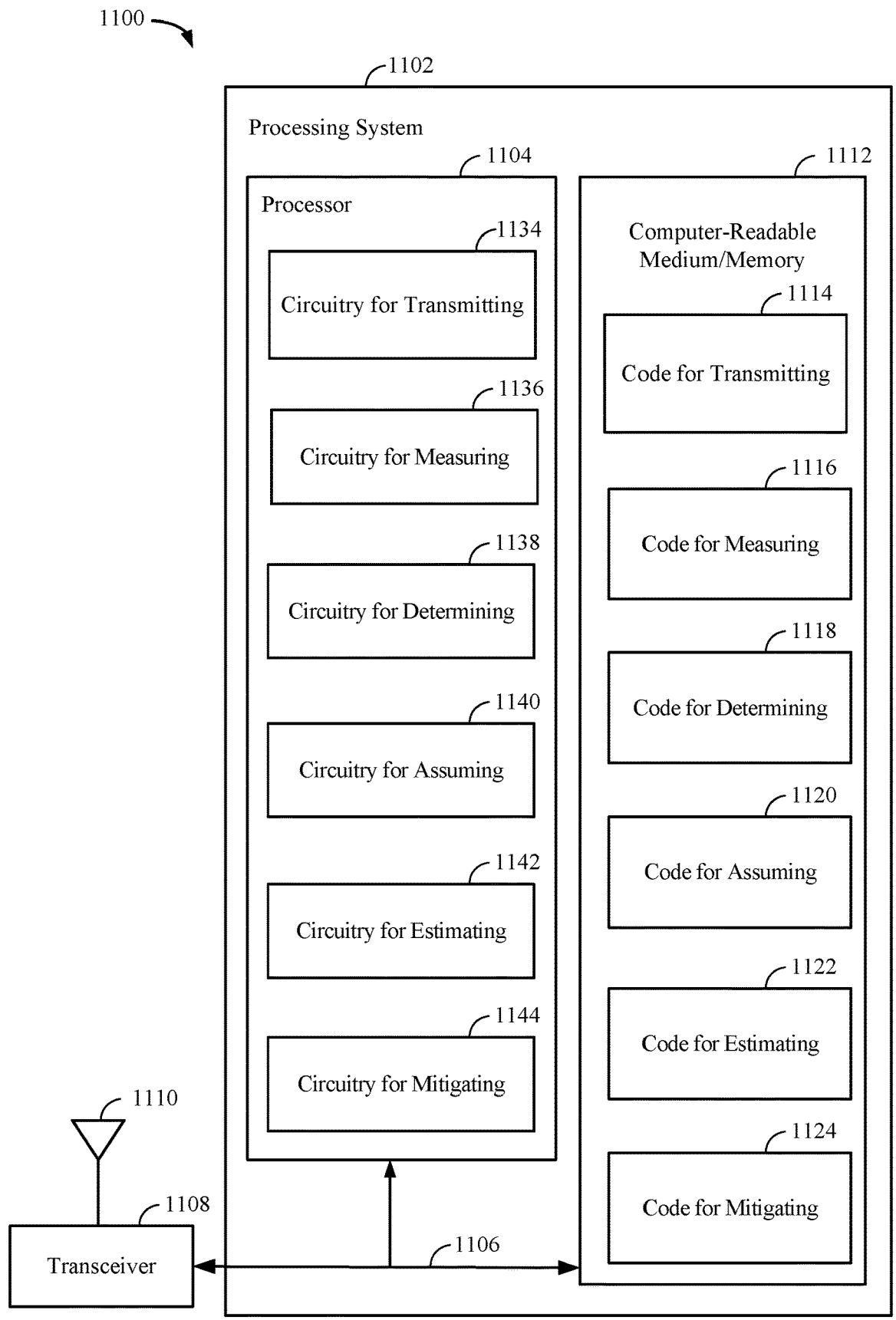
FIG. 11 illustrates a communications device that may include various components configured to perform operations for the techniques disclosed herein, in accordance with aspects of the present disclosure.

FIG. 11 illustrates a communications device 1100 that may include various components (e.g., corresponding to means-plus-function components) operable, configured, or adapted to perform operations for the techniques disclosed herein, such as the operations illustrated in FIG. 8. In some examples, communications device 1100 may be a user equipment (UE), such as UE 120a as described with respect to FIGS. 1 and 2.

Communications device 1100 includes a processing system 1102 (e.g., corresponding to controller/processor 280) coupled to a transceiver 1108 (e.g., a transmitter and/or a receiver). Transceiver 1108 may correspond to one or more of transmit processor 264, TX MIMO processor 266, modulator/demodulator 254, receive processor 258, and MIMO detector 256 of FIG. 2. Transceiver 1108 is configured to transmit and receive signals for communications device 1100 via an antenna 1110, such as the various signals as described herein. Processing system 1102 may be configured to perform processing functions for communications device 1100, including processing signals received and/or to be transmitted by communications device 1100.

Processing system 1102 includes a processor 1104 coupled to a computer-readable medium/memory 1112 via a bus 1106. In certain aspects, computer-readable medium/memory 1112 is configured to store instructions (e.g., computer-executable code) that when executed by processor 1104, cause processor 1104 to perform the operations illustrated in FIG. 8, or other operations for performing the various techniques discussed herein for phase noise (PN) mitigation.

In certain aspects, computer-readable medium/memory 1112 stores code 1114 (an example means for) for transmitting; code 916 (an example means for) for measuring; code 1118 (an example means for) for determining; code 1120 (an example means for) for assuming; code 1122 (an example means for) for estimating; and code 1124 (an example means for) for mitigating.

In certain aspects, code 1114 for transmitting may include code for transmitting, to a network entity, an indication of a capability of the UE to mitigate the PN on each component carrier (CC) for all CCs configured for the UE when only one CC configured for the UE is configured with pilots for PN mitigation.

In certain aspects, code 1116 for measuring may include code for measuring physical downlink shared channel (PDSCH) allocation size for the CCs configured for the UE.

In certain aspects, code 1118 for determining may include code for determining a CC of the CCs configured for the UE having a largest PDSCH allocation size based on the measuring, wherein the CC configured for the UE having the largest PDSCH allocation size is configured with the pilots for PN mitigation.

In certain aspects, code 1120 for assuming may include code for assuming the first CC configured for the UE is the PCC in accordance with the configuration, wherein the PCC is configured with the pilots for PN mitigation. In certain aspects, code 1120 for assuming may include code for assuming the first CC configured for the UE is the CC having the largest PDSCH allocation size in accordance with the rule.

In certain aspects, code 1122 for estimating may include code for estimating impairments caused by PN for only a first CC configured for the UE, wherein the first CC is configured with pilots for PN mitigation.

In certain aspects, code 1124 for mitigating may include code for mitigating the PN on each CC for all CCs configured for the UE based, at least in part, on the estimated impairments for the first CC.

In certain aspects, processor 1104 has circuitry configured to implement the code stored in computer-readable medium/memory 1112. Processor 1104 includes circuitry 1134 (an example means for) for transmitting; circuitry 1136 (an example means for) for measuring; circuitry 1138 (an example means for) for determining; circuitry 1140 (an example means for) for assuming; circuitry 1142 (an example means for) for estimating; and circuitry 1144 (an example means for) for mitigating.

In certain aspects, circuitry 1134 for transmitting may include circuitry for transmitting, to a network entity, an indication of a capability of the UE to mitigate the PN on each component carrier (CC) for all CCs configured for the UE when only one CC configured for the UE is configured with pilots for PN mitigation.

In certain aspects, circuitry 1136 for measuring may include circuitry for measuring PDSCH allocation size for the CCs configured for the UE.

In certain aspects, circuitry 1138 for determining may include circuitry for determining a CC of the CCs configured for the UE having a largest PDSCH allocation size based on the measuring, wherein the CC configured for the UE having the largest PDSCH allocation size is configured with the pilots for PN mitigation.

In certain aspects, circuitry 1140 for assuming may include circuitry for assuming the first CC configured for the UE is the PCC in accordance with the configuration, wherein the PCC is configured with the pilots for PN mitigation. In certain aspects, circuitry 1140 for assuming may include circuitry for assuming the first CC configured for the UE is the CC having the largest PDSCH allocation size in accordance with the rule.

In certain aspects, circuitry 1142 for estimating may include circuitry for estimating impairments caused by PN for only a first CC configured for the UE, wherein the first CC is configured with pilots for PN mitigation.

In certain aspects, circuitry 1144 for mitigating may include circuitry for mitigating the PN on each CC for all CCs configured for the UE based, at least in part, on the estimated impairments for the first CC.

In some cases, the operations illustrated in FIG. 8, as well as other operations described herein for PN mitigation, may be implemented by one or more means-plus-function components. For example, in some cases, such operations may be implemented by means for transmitting (or means for outputting for transmission), means for measuring, means for determining, means for assuming, means for estimating, and means for mitigating.

In some cases, means for transmitting (or means for outputting for transmission) includes a transmitter (such as transmit processor 264) and/or an antenna(s) 252 of UE 120*a* illustrated in FIG. 2 and/or circuitry 1134 for transmitting of communications device 1100 in FIG. 11.

In some cases, means for measuring, means for determining, means for assuming, means for estimating, and means for mitigating, includes a processing system, which may include one or more processors, such as receive processor 258, transmit processor 264, TX MIMO processor 266, and/or controller/processor 280 of UE 120*a* illustrated in FIG. 2 and/or processing system 1102 of communications device 1100 in FIG. 11.

Notably, FIG. 11 is just use one example, and many other examples and configurations of communications device 1100 are possible.

Figure 12:
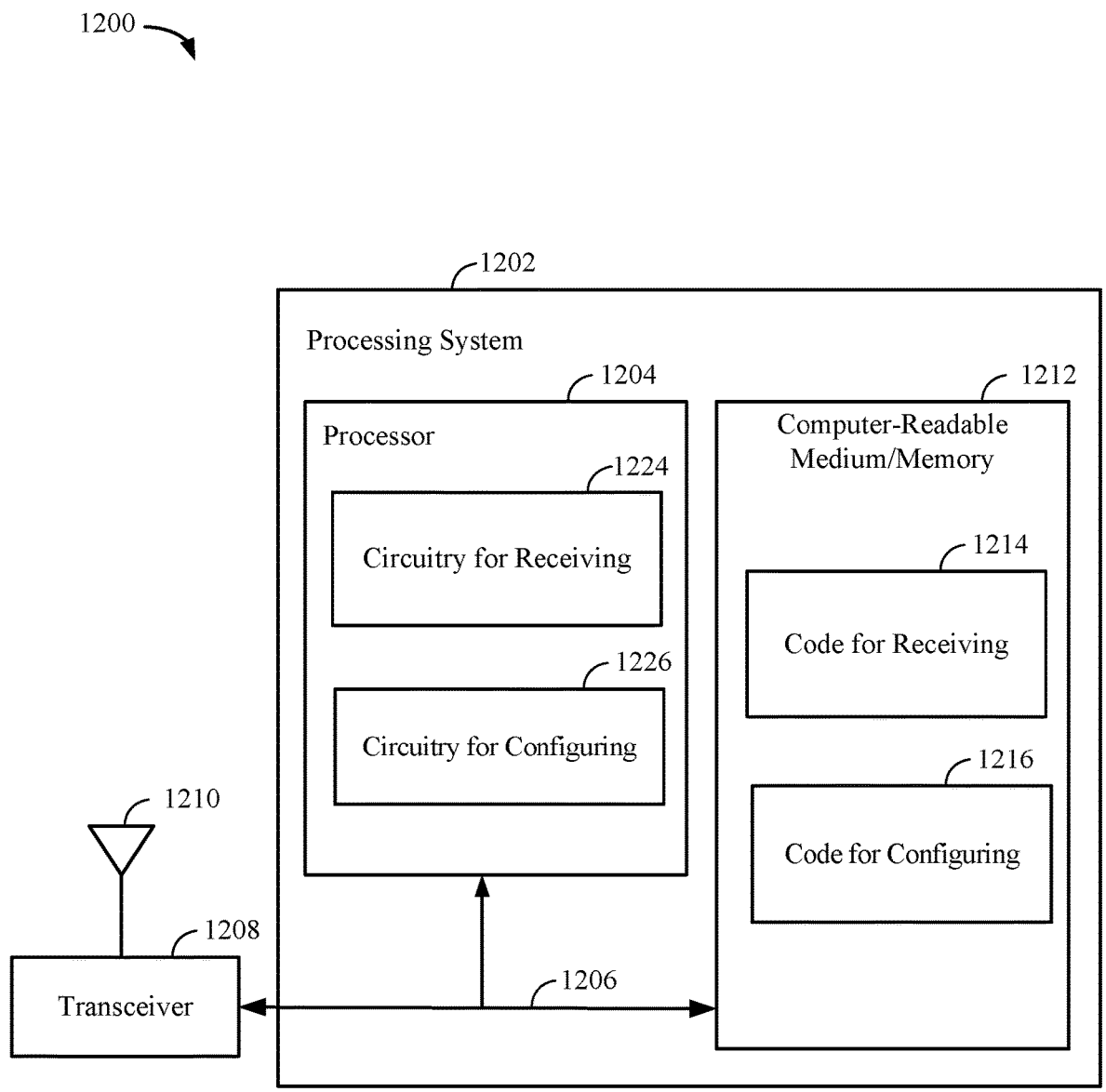
FIG. 12 illustrates a communications device that may include various components configured to perform operations for the techniques disclosed herein, in accordance with aspects of the present disclosure.

FIG. 12 illustrates a communications device 1200 that may include various components (e.g., corresponding to means-plus-function components) operable, configured, or adapted to perform operations for the techniques disclosed herein, such as the operations illustrated in FIG. 9. In some examples, communications device 1200 may be a network entity or base station (BS), such as BS 110*a* as described with respect to FIGS. 1 and 2.

Communications device 1200 includes a processing system 1202 (e.g., corresponding to controller/processor 240) coupled to a transceiver 1208 (e.g., a transmitter and/or a receiver). Transceiver 1208 may correspond to one or more of transmit processor 220, TX MIMO processor 230, modulator/demodulator 232, receive processor 238, and MIMO detector 236 of FIG. 2. Transceiver 1208 is configured to transmit and receive signals for communications device 1200 via an antenna 1210, such as the various signals as described herein. Processing system 1202 may be configured to perform processing functions for communications device 1200, including processing signals received and/or to be transmitted by communications device 1200.

Processing system 1202 includes a processor 1204 coupled to a computer-readable medium/memory 1212 via a bus 1206. In certain aspects, computer-readable medium/memory 1212 is configured to store instructions (e.g., computer-executable code) that when executed by processor 1204, cause processor 1204 to perform the operations illustrated in FIG. 9, or other operations for performing the various techniques discussed herein for PN mitigation.

In certain aspects, computer-readable medium/memory 1212 stores code 1214 (an example means for) for receiving and code 1216 (an example means for) for configuring.

In certain aspects, code 1214 for receiving may include code for receiving, from a UE, an indication of a capability of the UE to mitigate PN on each CC for all CCs configured for the UE when only one CC configured for the UE is configured with pilots for PN mitigation.

In certain aspects, code 1216 for configuring may include code for configuring a first CC configured for the UE with the pilots for PN mitigation in accordance with the capability. In certain aspects, code 1216 for configuring may include code for configuring the UE to assume the first CC configured with the pilots for PN mitigation is a PCC configured for the UE, such that the UE estimates impairments caused by PN for only the PCC configured for the UE.

In certain aspects, code 1216 for configuring may include code for configuring multiple CCs configured for the UE or bandwidth parts (BWPs) with the pilots for PN mitigation. In certain aspects, code 1216 for configuring may include code for configuring the UE with a rule to assume the first CC configured with the pilots for PN mitigation is a CC configured for the UE having a largest PDSCH allocation size, such that the UE estimates impairments caused by PN for only the CC configured for the UE having the largest PDSCH allocation size.

In certain aspects, processor 1204 has circuitry configured to implement the code stored in computer-readable medium/memory 1212. Processor 1204 includes circuitry 1224 (an example means for) for receiving and circuitry 1226 (an example means for) for configuring.

In certain aspects, circuitry 1224 for receiving may include circuitry for receiving, from a UE, an indication of a capability of the UE to mitigate PN on each CC for all CCs configured for the UE when only one CC configured for the UE is configured with pilots for PN mitigation.

In certain aspects, circuitry 1226 for configuring may include circuitry for configuring a first CC configured for the UE with the pilots for PN mitigation in accordance with the capability. In certain aspects, circuitry 1226 for configuring may include circuitry for configuring the UE to assume the first CC configured with the pilots for PN mitigation is a PCC configured for the UE, such that the UE estimates impairments caused by PN for only the PCC configured for the UE. In certain aspects, circuitry 1226 for configuring may include circuitry for configuring multiple CCs configured for the UE or BWPs with the pilots for PN mitigation. In certain aspects, circuitry 1226 for configuring may include circuitry for configuring the UE with a rule to assume the first CC configured with the pilots for PN mitigation is a CC configured for the UE having a largest PDSCH allocation size, such that the UE estimates impairments caused by PN for only the CC configured for the UE having the largest PDSCH allocation size.

In some cases, the operations illustrated in FIG. 9, as well as other operations described herein for PN mitigation, may be implemented by one or more means-plus-function components. For example, in some cases, such operations may be implemented by means for means for receiving (or means for obtaining) and means for configuring.

In some cases, means for receiving (or means for obtaining) includes a receiver (such as the receive processor 238) and/or an antenna(s) 234 of BS 110*a* illustrated in FIG. 2 and/or circuitry 1224 for receiving of communications device 1200 in FIG. 12.

In some cases, means for configuring, includes a processing system, which may include one or more processors, such as receive processor 238, transmit processor 220, TX MIMO processor 230, and/or controller/processor 240 of BS 110*a* illustrated in FIG. 2 and/or processing system 1202 of communications device 1200 in FIG. 12.

Notably, FIG. 12 is just use one example, and many other examples and configurations of communications device 1200 are possible.

PN manager 122 and PN manager 112 may support wireless communication in accordance with examples as disclosed herein.

PN manager 122 and PN manager 112 may be an example of means for performing various aspects described herein. PN manager 122 and PN manager 112, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, PN manager 122 and PN manager 112, or its sub-components, may be implemented in code (e.g., as configuration management software or firmware) executed by a processor, or any combination thereof. If implemented in code executed by a processor, the functions of PN manager 122 and PN manager 112, or its sub-components may be executed by a general-purpose processor, a DSP, an ASIC, a FPGA or other programmable logic device.

In some examples, PN manager 122 and PN manager 112 may be configured to perform various operations (e.g., receiving, determining, transmitting/sending) using or otherwise in cooperation with the transceiver 1108 or 1208.

PN manager 122 and PN manager 112, or its sub-components, may be physically located at various positions, including being distributed such that portions of functions are implemented at different physical locations by one or more physical components. In some examples, PN manager 122 and PN manager 112, or its sub-components, may be a separate and distinct component in accordance with various aspects of the present disclosure. In some examples, PN manager 122 and PN manager 112, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1: A method for wireless communication by a user equipment (UE), comprising: estimating impairments caused by phase noise (PN) for only a first component carrier (CC) configured for the UE, wherein the first CC is configured with pilots for PN mitigation; and mitigating the PN on each CC for all CCs configured for the UE based, at least in part, on the estimated impairments for the first CC.

Clause 2: The method of Clause 1, wherein the pilots for PN mitigation configured at the first CC comprise: phase tracking reference signal (PTRS) pilots, wherein the PTRS pilots comprise regular PTRS pilots or data-aided PTRS pilots; or enhanced PTRS (ePTRS) pilots.

Clause 3: The method of Clause 2, wherein: when the first CC is configured with PTRS pilots, estimating the impairments comprises estimating common phase error (CPE); and when the first CC is configured with ePTRS pilots, estimating the impairments comprises estimating the CPE and inter-carrier-interference (ICI).

Clause 4: The method of any of Clauses 1-3, wherein: the CCs configured for the UE comprise a primary CC (PCC) and one or more secondary CCs (SCCs); and the first CC configured with pilots for PN mitigation is the PCC.

Clause 5: The method of Clause 4, wherein the one or more SCCs are not configured with pilots for PN mitigation.

Clause 6: The method of any of Clauses 1-5, further comprising: transmitting, to a network entity, an indication of a capability of the UE to mitigate the PN on the each CC for all CCs configured for the UE when only one CC configured for the UE is configured with pilots for PN mitigation; and wherein the first CC is configured with the pilots for PN mitigation in accordance with the capability.

Clause 7: The method of Clause 6, wherein the first CC is configured with the pilots for PN mitigation via radio resource control (RRC) signaling.

Clause 8: The method of Clause 6 or 7, wherein the capability of the UE to mitigate the PN on the each CC for all CCs configured for the UE when only one CC configured for the UE is configured with pilots for PN mitigation varies per bandwidth part (BWP).

Clause 9: The method of Clause 8, wherein the first CC is configured with the pilots for PN mitigation in accordance with the capability by the network entity configuring a BWP with the pilots for PN mitigation, wherein the BWP corresponds to the first CC.

Clause 10: The method of any of Clauses 1-9, wherein the UE is configured with a configuration to assume the first CC configured with the pilots for PN mitigation is a primary CC (PCC) configured for the UE, such that the UE estimates impairments caused by PN for only the PCC configured for the UE.

Clause 11: The method of Clause 10, wherein the UE is configured to assume the first CC configured with the pilots for PN mitigation is the PCC configured for the UE via radio resource control (RRC) signaling or hard coding of the UE.

Clause 12: The method of Clause 10 or 11, further comprising: assuming the first CC configured for the UE is the PCC in accordance with the configuration, wherein the PCC is configured with the pilots for PN mitigation; and estimating impairments caused by PN for only the PCC.

Clause 13: The method of any of Clauses 1-12, wherein the UE is configured with a rule to assume the first CC configured with the pilots for PN mitigation is a CC configured for the UE having a largest physical downlink shared channel (PDSCH) allocation size when multiple CCs configured for the UE are configured with pilots for PN mitigation, such that the UE estimates impairments caused by PN for only the CC configured for the UE having the largest PDSCH allocation size.

Clause 14: The method of Clause 13, wherein the UE is configured with the rule via radio resource control (RRC) signaling.

Clause 15: The method of Clause 13 or 14, further comprising: measuring PDSCH allocation size for the CCs configured for the UE; determining a CC of the CCs configured for the UE having a largest PDSCH allocation size based on the measuring, wherein the CC configured for the UE having the largest PDSCH allocation size is configured with the pilots for PN mitigation; assuming the first CC configured for the UE is the CC having the largest PDSCH allocation size in accordance with the rule; and estimating impairments caused by PN for only the CC having the largest PDSCH allocation size.

Clause 16: The method of any of Clauses 1-15, wherein the CCs configured for the UE comprise: contiguous CCs in a same frequency band; or non-contiguous CCs in the same frequency band.

Clause 17: A method for wireless communication by a network entity, comprising: receiving, from a user equipment (UE), an indication of a capability of the UE to mitigate phase noise (PN) on each component carrier (CC) for all CCs configured for the UE when only one CC configured for the UE is configured with pilots for PN mitigation; and configuring a first CC configured for the UE with the pilots for PN mitigation in accordance with the capability.

Clause 18: The method of Clause 17, wherein the first CC configured for the UE is configured with the pilots for PN mitigation via radio resource control (RRC) signaling.

Clause 19: The method of Clause 17 or 18, wherein the pilots for PN mitigation configured at the first CC comprise: phase tracking reference signal (PTRS) pilots, wherein the PTRS pilots comprise regular PTRS pilots or data-aided PTRS pilots; or enhanced PTRS (ePTRS) pilots.

Clause 20: The method of any of Clauses 17-19, wherein: the CCs configured for the UE comprise a primary CC (PCC) and one or more secondary CCs (SCCs); and configuring the first CC configured for the UE with the pilots for PN mitigation comprises configuring the PCC with the pilots for PN mitigation.

Clause 21: The method of Clause 20, wherein the one or more SCCs are not configured with pilots for PN mitigation.

Clause 22: The method of any of Clauses 17-21, wherein the capability of the UE to mitigate the PN on the each CC for all CCs configured for the UE when only one CC configured for the UE is configured with pilots for PN mitigation varies per bandwidth part (BWP).

Clause 23: The method of Clause 22, wherein configuring the first CC configured for the UE with the pilots for PN mitigation comprises configuring a BWP with the pilots for PN mitigation, wherein the BWP corresponds to the first CC.

Clause 24: The method of any of Clauses 17-23, further comprising configuring the UE to assume the first CC configured with the pilots for PN mitigation is a primary CC (PCC) configured for the UE, such that the UE estimates impairments caused by PN for only the PCC configured for the UE.

Clause 25: The method of Clause 24, wherein configuring the UE to assume the first CC configured with the pilots for PN mitigation is the PCC configured for the UE is via radio resource control (RRC) signaling.

Clause 26: The method of any of Clauses 17-25, further comprising: configuring multiple CCs configured for the UE or bandwidth parts (BWPs) with the pilots for PN mitigation; and configuring the UE with a rule to assume the first CC configured with the pilots for PN mitigation is a CC configured for the UE having a largest physical downlink shared channel (PDSCH) allocation size, such that the UE estimates impairments caused by PN for only the CC configured for the UE having the largest PDSCH allocation size.

Clause 27: The method of Clause 26, wherein configuring the UE with the rule is via radio resource control (RRC) signaling.

Clause 28: The method of any of Clauses 17-27, wherein the CCs configured for the UE comprise: contiguous CCs in a same frequency band; or non-contiguous CCs in the same frequency band.

Clause 29: An apparatus, comprising: at least one processor; and a memory coupled to the at least one processor, the memory including instructions executable by the at least one processor to cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8 and 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
   estimating impairments caused by phase noise (PN) for only a first component carrier (CC) configured for the UE, wherein the first CC is configured with pilots for PN mitigation; and
   mitigating the PN on each CC for all CCs configured for the UE based, at least in part, on the estimated impairments for the first CC; and
   transmitting, to a network entity, an indication of a capability of the UE to mitigate the PN on the each CC for all CCs configured for the UE when only one CC configured for the UE is configured with pilots for PN mitigation,
   wherein the first CC is configured with the pilots for PN mitigation in accordance with the capability and wherein the capability of the UE to mitigate the PN on the each CC for all CCs configured for the UE when only one CC configured for the UE is configured with pilots for PN mitigation varies per bandwidth part (BWP).

2. The method of claim 1, wherein the pilots for PN mitigation configured at the first CC comprise:
   phase tracking reference signal (PTRS) pilots, wherein the PTRS pilots comprise regular PTRS pilots or data-aided PTRS pilots; or
   enhanced PTRS (ePTRS) pilots.

3. The method of claim 2, wherein:
   when the first CC is configured with PTRS pilots, estimating the impairments comprises estimating common phase error (CPE); and
   when the first CC is configured with ePTRS pilots, estimating the impairments comprises estimating the CPE and inter-carrier-interference (ICI).

4. The method of claim 1, wherein:
   the CCs configured for the UE comprise a primary CC (PCC) and one or more secondary CCs (SCCs); and
   the first CC configured with pilots for PN mitigation is the PCC.

5. The method of claim 4, wherein the one or more SCCs are not configured with pilots for PN mitigation.

6. The method of claim 1, wherein the first CC is configured with the pilots for PN mitigation via radio resource control (RRC) signaling.

7. The method of claim 1, wherein the first CC is configured with the pilots for PN mitigation in accordance with the capability by the network entity configuring a BWP with the pilots for PN mitigation, wherein the BWP corresponds to the first CC.

8. The method of claim 1, wherein the UE is configured with a configuration to assume the first CC configured with the pilots for PN mitigation is a primary CC (PCC) configured for the UE, such that the UE estimates impairments caused by PN for only the PCC configured for the UE.

9. The method of claim 8, wherein the UE is configured to assume the first CC configured with the pilots for PN mitigation is the PCC configured for the UE via radio resource control (RRC) signaling or hard coding of the UE.

10. The method of claim 8, further comprising:
    assuming the first CC configured for the UE is the PCC in accordance with the configuration, wherein the PCC is configured with the pilots for PN mitigation; and
    estimating impairments caused by PN for only the PCC.

11. The method of claim 1, wherein the UE is configured with a rule to assume the first CC configured with the pilots for PN mitigation is a CC configured for the UE having a largest physical downlink shared channel (PDSCH) allocation size when multiple CCs configured for the UE are configured with pilots for PN mitigation, such that the UE estimates impairments caused by PN for only the CC configured for the UE having the largest PDSCH allocation size.

12. The method of claim 11, wherein the UE is configured with the rule via radio resource control (RRC) signaling.

13. The method of claim 11, further comprising:
    measuring PDSCH allocation size for the CCs configured for the UE;
    determining a CC of the CCs configured for the UE having a largest PDSCH allocation size based on the measuring, wherein the CC configured for the UE having the largest PDSCH allocation size is configured with the pilots for PN mitigation;
    assuming the first CC configured for the UE is the CC having the largest PDSCH allocation size in accordance with the rule; and
    estimating impairments caused by PN for only the CC having the largest PDSCH allocation size.

14. The method of claim 1, wherein the CCs configured for the UE comprise:
    contiguous CCs in a same frequency band; or
    non-contiguous CCs in the same frequency band.

15. A method for wireless communication by a network entity, comprising:
    receiving, from a user equipment (UE), an indication of a capability of the UE to mitigate phase noise (PN) on each component carrier (CC) for all CCs configured for the UE when only one CC configured for the UE is configured with pilots for PN mitigation; and
    configuring a first CC configured for the UE with the pilots for PN mitigation in accordance with the capability, wherein the capability of the UE to mitigate the PN on the each CC for all CCs configured for the UE when only one CC configured for the UE is configured with pilots for PN mitigation varies per bandwidth part (BWP).

16. The method of claim 15, wherein the first CC configured for the UE is configured with the pilots for PN mitigation via radio resource control (RRC) signaling.

17. The method of claim 15, wherein the pilots for PN mitigation configured at the first CC comprise:
    phase tracking reference signal (PTRS) pilots, wherein the PTRS pilots comprise regular PTRS pilots or data-aided PTRS pilots; or
    enhanced PTRS (ePTRS) pilots.

18. The method of claim 15, wherein:
    the CCs configured for the UE comprise a primary CC (PCC) and one or more secondary CCs (SCCs); and
    configuring the first CC configured for the UE with the pilots for PN mitigation comprises configuring the PCC with the pilots for PN mitigation.

19. The method of claim 18, wherein the one or more SCCs are not configured with pilots for PN mitigation.

20. The method of claim 15, wherein configuring the first CC configured for the UE with the pilots for PN mitigation comprises configuring a BWP with the pilots for PN mitigation, wherein the BWP corresponds to the first CC.

21. The method of claim 15, further comprising configuring the UE to assume the first CC configured with the pilots for PN mitigation is a primary CC (PCC) configured for the UE, such that the UE estimates impairments caused by PN for only the PCC configured for the UE.

22. The method of claim 21, wherein configuring the UE to assume the first CC configured with the pilots for PN mitigation is the PCC configured for the UE is via radio resource control (RRC) signaling.

23. The method of claim 15, further comprising:
configuring multiple CCs configured for the UE or bandwidth parts (BWPs) with the pilots for PN mitigation; and
configuring the UE with a rule to assume the first CC configured with the pilots for PN mitigation is a CC configured for the UE having a largest physical downlink shared channel (PDSCH) allocation size, such that the UE estimates impairments caused by PN for only the CC configured for the UE having the largest PDSCH allocation size.

24. The method of claim 23, wherein configuring the UE with the rule is via radio resource control (RRC) signaling.

25. The method of claim 15, wherein the CCs configured for the UE comprise:
contiguous CCs in a same frequency band; or
non-contiguous CCs in the same frequency band.

26. An apparatus for wireless communications by a user equipment (UE), comprising:
at least one processor; and
a memory coupled to the at least one processor, the memory including instructions executable by the at least one processor to cause the apparatus to:
estimate impairments caused by phase noise (PN) for only a first component carrier (CC) configured for the UE, wherein the first CC is configured with pilots for PN mitigation; and
mitigate the PN on each CC for all CCs configured for the UE based, at least in part, on the estimated impairments for the first CC; and
transmitting, to a network entity, an indication of a capability of the UE to mitigate the PN on the each CC for all CCs configured for the UE when only one CC configured for the UE is configured with pilots for PN mitigation,
wherein the first CC is configured with the pilots for PN mitigation in accordance with the capability and wherein the capability of the UE to mitigate the PN on the each CC for all CCs configured for the UE when only one CC configured for the UE is configured with pilots for PN mitigation varies per bandwidth part (BWP).

27. An apparatus for wireless communications by a user equipment (UE), comprising:
at least one processor; and
a memory coupled to the at least one processor, the memory including instructions executable by the at least one processor to cause the apparatus to:
receive, from a user equipment (UE), an indication of a capability of the UE to mitigate phase noise (PN) on each component carrier (CC) for all CCs configured for the UE when only one CC configured for the UE is configured with pilots for PN mitigation; and
configure a first CC configured for the UE with the pilots for PN mitigation in accordance with the capability, wherein the capability of the UE to mitigate the PN on the each CC for all CCs configured for the UE when only one CC configured for the UE is configured with pilots for PN mitigation varies per bandwidth part (BWP).

\* \* \* \* \*